(12) United States Patent
Ito

(10) Patent No.: US 8,767,111 B2
(45) Date of Patent: Jul. 1, 2014

(54) DEVICE INCLUDING TOUCH SWITCH AND PUSHBUTTON FUNCTIONS

(75) Inventor: Makoto Ito, Saitama (JP)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 0 days.

(21) Appl. No.: 13/510,960

(22) PCT Filed: Nov. 29, 2010

(86) PCT No.: PCT/US2010/058175
§ 371 (c)(1),
(2), (4) Date: May 21, 2012

(87) PCT Pub. No.: WO2011/068746
PCT Pub. Date: Jun. 9, 2011

(65) Prior Publication Data
US 2012/0262619 A1  Oct. 18, 2012

(30) Foreign Application Priority Data

Dec. 1, 2009  (JP) ................................. 2009-273843

(51) Int. Cl.
*H04N 5/222*  (2006.01)
(52) U.S. Cl.
USPC .................................. 348/333.01; 455/556.1
(58) Field of Classification Search
CPC ....... G06F 3/016; G06F 3/0414; G06F 3/041; G06F 3/0213; G06F 1/1643; G06F 1/1692; H04N 5/23293
USPC .............................. 348/207.99, 211.4–211.7, 348/333.01–333.13, 374, 552; 345/156, 345/173–178; 396/287, 263; 340/407.2, 340/407.1; 178/18.01–20.04; 200/512–517; 455/566, 556.1; 341/22
See application file for complete search history.

(56) References Cited

U.S. PATENT DOCUMENTS

| | | | |
|---|---|---|---|
| 4,247,188 A * | 1/1981 | Kobori | 396/263 |
| 2003/0025679 A1* | 2/2003 | Taylor et al. | 345/175 |

(Continued)

FOREIGN PATENT DOCUMENTS

| | | | |
|---|---|---|---|
| CN | 101 515 2010 | 8/2009 | |
| CN | 101515210 A * | 8/2009 | G06F 3/041 |

(Continued)

OTHER PUBLICATIONS

International Preliminary Report on Patentability for PCT/US2010/058175, issued Jun. 5, 2012.
Office Action on Japanese Application 2009-273843, mailed Sep. 4, 2013 (English translation not available).

*Primary Examiner* — Lin Ye
*Assistant Examiner* — Dennis Hogue

(57) ABSTRACT

An object of the present invention is to provide an operation device which has a pushbutton function and a touch switch function, and which offers excellent ease of operation. A hole is provided in a transparent substrate (12) of a touch screen provided on a rear surface of an image capturing device, and a pushbutton (16) serving as a shutter release button is provided. Transparent electrodes (14) are formed around the pushbutton (16) to form a touch switch, and an electrode (20) is formed below the pushbutton (16) to form a pushbutton switch. Metering is performed when the touch switch is turned ON in response to a touch operation of the pushbutton (16), and an image is captured when the pushbutton switch is turned ON in response to a push-down operation of the pushbutton (16).

18 Claims, 3 Drawing Sheets

(56) References Cited

U.S. PATENT DOCUMENTS

| | | | |
|---|---|---|---|
| 2006/0284836 A1* | 12/2006 | Philipp | 345/156 |
| 2007/0019942 A1* | 1/2007 | Kurosawa | 396/287 |
| 2008/0088487 A1* | 4/2008 | Li | 341/22 |
| 2008/0202824 A1 | 8/2008 | Philipp et al. | |
| 2009/0117944 A1* | 5/2009 | Lee et al. | 455/566 |
| 2010/0149127 A1* | 6/2010 | Fisher et al. | 345/174 |
| 2010/0291973 A1* | 11/2010 | Nakahara et al. | 455/566 |
| 2011/0074560 A1* | 3/2011 | Pfau et al. | 340/407.2 |

FOREIGN PATENT DOCUMENTS

| | | |
|---|---|---|
| JP | 2004-206178 | 7/2004 |
| JP | 2009-016207 | 1/2009 |
| JP | 2009-091803 | 4/2009 |
| JP | 2009-116861 | 5/2009 |
| WO | 2007/084078 | 7/2007 |

\* cited by examiner

DEVICE INCLUDING TOUCH SWITCH AND PUSHBUTTON FUNCTIONS

PRIORITY INFORMATION

This application claims priority to Japanese Patent Application No. 2009-273843 filed on Dec. 1, 2009, which is incorporated herein by reference in its entirety.

BACKGROUND

1. Technical Field

The present invention relates to an operation device of an image capturing device, and particularly to an operation device which uses a touch switch.

2. Related Art

In image capturing devices, mobile phones, and other devices, a pushbutton, a slide switch, a touch switch, or the like is used as an operation device. For example, a pushbutton capable of operation such that it is pushed down in two stages is provided as a shutter switch of a digital camera, in which metering and focusing (focus adjustment) are performed with respect to a subject in response to a first-stage push operation (S1), and an image of the subject is captured in response to a second-stage push operation (S2). Further, with a touch screen, an image which is being captured or which has been captured is displayed on the screen, and various types of operation are performed by touch-operating the screen.

Patent Document 1 identified below discloses an operation device of a motor-operated blind. Patent Document 1 discloses an up button and a down button of a motor-operated blind which are provided with a pushbutton switch function and a touch switch function for performing raise and lower operation and angle adjustment operation of slats, wherein the up button is used to raise the slats and rotate the slats in one direction, and the down button is used to lower the slats and rotate the slats in another direction.

Further, Patent Document 2 identified below discloses a switch device. Patent Document 2 discloses a structure wherein a lock switch for detecting a first operation performed on an operation element and a capacitive touch switch for detecting a second operation performed on the operation element are provided, and output signals are output with the output time being varied between when the first operation is detected and when the second operation is detected.

[Patent Document 1]
  Japanese Patent Publication No. JP 2009-91803 A
[Patent Document 2]
  Japanese Patent Publication No. JP 2009-16207 A

SUMMARY

Although providing both a pushbutton switch and a touch switch is effective in terms of increasing ease of switch operation, a combination of a pushbutton switch structure and a touch switch structure will correspondingly complicate the mechanism, which results in an increase in cost and an increase in switch space. Particularly for digital cameras, mobile phones, personal digital assistants, and other mobile devices, cost reduction and space saving are required, and there is a need to enhance the switch function while meeting these requirements.

An object of the present invention is to provide an operation device which has a pushbutton function and a touch switch function, and which offers excellent ease of operation.

According to one aspect of the present invention, there is provided an operation device of an image capturing device, the operation device comprising a substrate; a pushbutton inserted into a hole provided in the substrate; a touch switch for detecting a touch operation of the pushbutton, the touch switch having a plurality of electrodes provided on a surface of the substrate and around the pushbutton; and a pushbutton switch which is closed in response to a push-down operation of the pushbutton, wherein the substrate is identical to a substrate which forms a touch screen included in the image capturing device, and the electrodes are formed on the same surface as a surface on which electrodes for forming the touch screen are formed on the substrate.

In one embodiment of the present invention, a film is formed between the substrate and the electrodes so that it covers the pushbutton.

In one embodiment of the present invention, the pushbutton is a shutter release button; and metering and focusing of the image capturing device are performed when the touch switch is turned ON, and an image of a subject is captured when the pushbutton switch is turned ON.

According to another aspect of the present invention, there is provided an image capturing device comprising a touch screen having a substrate and a first electrode; a shutter release button inserted into a hole provided in the substrate; a touch switch for detecting a touch operation of the shutter release button, the touch switch having a plurality of second electrodes formed around the shutter release button on a surface of the substrate, the surface being a surface on which the first electrode is formed; and a pushbutton switch which is closed in response to a push-down operation of the shutter release button, wherein metering and focusing of the image capturing device are performed when the touch switch is turned ON, and an image of a subject is captured when the pushbutton switch is turned ON.

By employing the present invention, it is possible to obtain an operation device which has a pushbutton function and a touch switch function, and which offers excellent ease of operation. Further, because the transparent substrate for implementing the touch switch function in the operation device is identical to the transparent substrate which forms the touch screen, it is possible to effectively reduce the manufacturing cost.

DETAILED DESCRIPTION

Embodiments of the present invention will be described below with reference to the accompanying drawings.

Figure 1A:
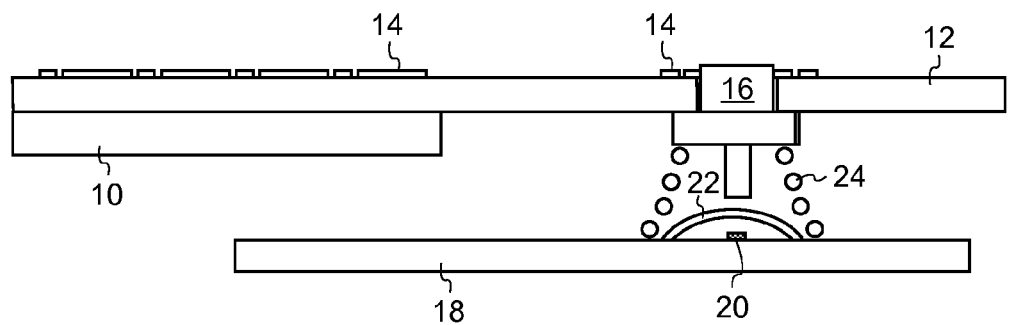
FIG. 1A is a schematic cross-sectional view of an operation device according to an embodiment of the present invention.
Figure 1B:
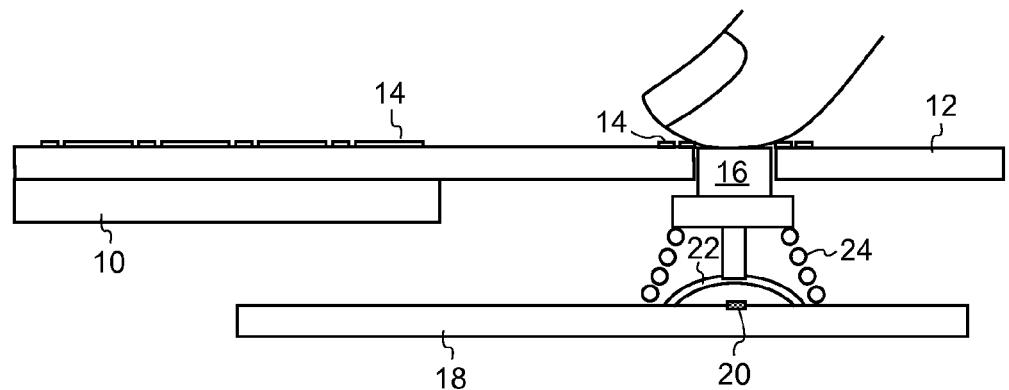
FIG. 1B is a schematic cross-sectional view of the operation device according to the embodiment.
Figure 1C:
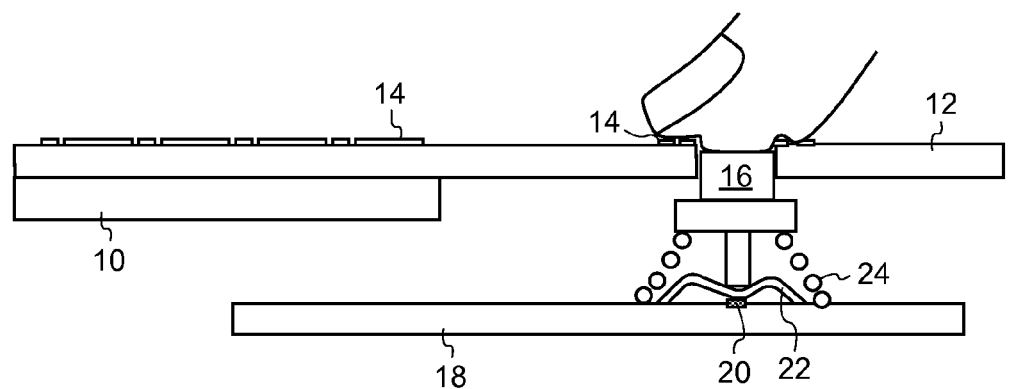
FIG. 1C is a schematic cross-sectional view of the operation device according to the embodiment.

FIG. 1A through FIG. 1C show schematic cross-sectional views of a digital camera according to an embodiment of the present invention. The digital camera according to the present embodiment is provided with an image capturing lens on the front surface thereof, and is provided with a screen and various types of operation switches on the rear surface thereof. The screen is a touch screen, and displays an image which is being captured, or an image which has been captured. Further, the screen displays various types of commands as a touch switch. The basic structure of a digital camera is known, but will be briefly described below.

Specifically, a digital camera has an optical system including a focus lens, a zoom lens, a shutter, and an aperture, and forms an image of a subject on an image sensor such as a CMOS image sensor or a CCD image sensor. The image sensor is formed by integrating a photoreceptor, an analog gain, an A/D converter, and a timing generator in a single chip. An infrared cut filter and an optical low-pass filter are provided between the optical system and the image sensor. Further, the image sensor is provided with a microlens array and a Bayer pattern color filter. The analog gain includes an AGC (automatic gain controller), and amplifies an image signal and outputs it. The gain of the AGC is controlled by the timing generator. The A/D converter converts an analog voltage signal to a digital signal, and outputs it.

Further, the digital camera has an image processing circuit. The image processing circuit performs processing for gain correction (white balance sensitivity setting), gamma correction, color interpolation processing, RGB-YC conversion processing, noise reduction processing, edge enhancement, and JPEG compression. The gain correction is processing for correcting the gain using a gain correction coefficient calculated from RGB signals. Methods for calculating a gain correction coefficient include, for example, a method in which gain correction coefficients for a tungsten lamp, a fluorescent lamp, clear weather, or the like are preset, and a user manually switches between them, a method in which average values for each of RGB signals are calculated, and a gain correction coefficient is calculated so that the average values will be equal to each other, and a method in which histograms for each of RGB signals are calculated, and a gain correction coefficient is calculated by estimating the color of the illumination light source based on the histograms. In the gamma correction, an output from a CIS is matched to the input and output characteristics of the display. In the color interpolation processing, an image signal output from the Bayer pattern image sensor is separated into an R signal, a G signal, and a B signal, and missing-pixel signals are interpolated using surrounding-pixel signals in the respective color signals. In the color interpolation processing, missing pixels are interpolated by adding and averaging adjacent-pixel values. In the RGB-YC conversion processing, a luminance signal Y and color difference signals, Cr and Cb signals, are generated from RGB signals. In the edge enhancement, a reduction in MTF caused by the optical low-pass filter or the like and a reduction in MTF caused by an effect of the CCD aperture are corrected, or the sharpness of an image is increased so that the lightness and darkness become more distinct. In the noise reduction processing, smoothing processing and isolated point removal using a median filter are performed. In the JPEG compression, image data is divided into 8×8 blocks, and DCT, quantization, and Huffman coding are sequentially performed to compress the image data. The image signal obtained through the image processing performed in the image processing circuit is output to the screen and displayed thereon, or is output to the memory card and stored therein. As the memory card, an SD card or another flash memory may be used.

Further, the digital camera has an AE/AF control circuit. The AE/AF control circuit performs AE and AF. For the AE, a weighted average value (an average luminance level) of an image signal is calculated, and the signal average value is compared with a reference value to determine an exposure value. Metering methods (algorithms for determining an average luminance level) include, for example, center-weighted metering, spot metering, and multi-zone metering. For the AF, there are, for example, a contrast detection method and a TTL phase difference detection method. The AE/AF control circuit outputs a control signal to the timing generator based on the determined exposure value, and the timing generator controls the gain of the analog front end (AFE) based on the control signal to control the exposure time. Further, it controls the focus and the aperture of the optical system.

The digital camera according to the present embodiment has the basic structure as described above, and additionally has a shutter release button near the touch screen provided on the rear surface. The user aims the lens provided on the front surface of the digital camera at a subject, and simultaneously operates the shutter release button provided on the rear surface of the digital camera to adjust the focus and capture an image of the subject. The shutter release button according to the present embodiment is configured to have both a push-button switch function and a touch switch function.

Figure 2:
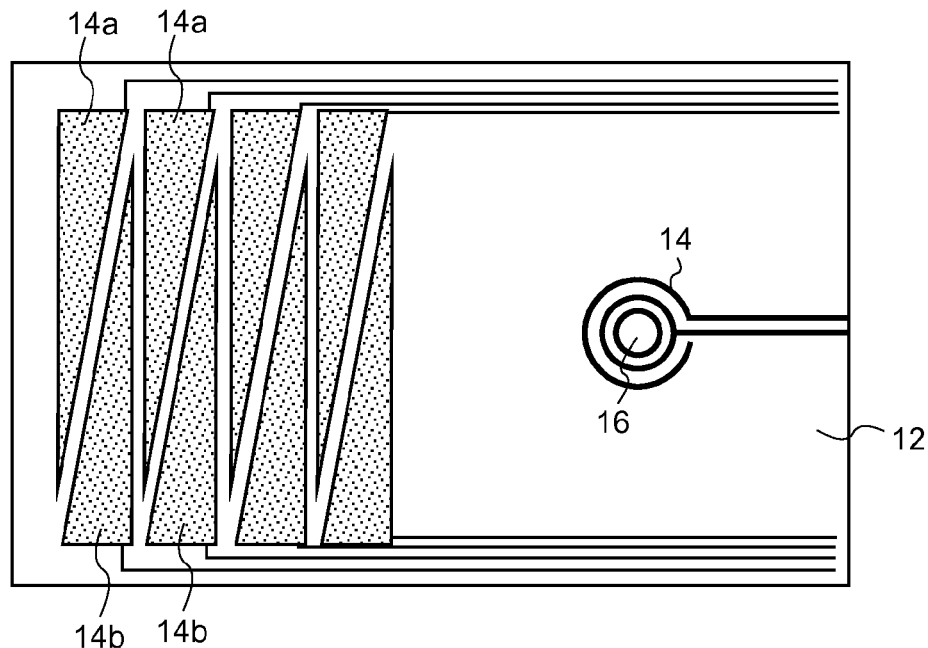
FIG. 2 is a schematic plan view of the operation device according to the embodiment.

Referring to FIG. 1A, a liquid crystal display device 10 is provided at a predetermined position on the rear surface of the digital camera. As the structure and the drive circuit of the liquid crystal display device 10 are well known, the explanation is not provided here. The liquid crystal display device 10 displays an image which is to be captured, or reads and displays an image which has been already captured and stored in a memory card. A substrate, which is a transparent substrate 12 in the present embodiment, is provided on an upper surface of the liquid crystal display device 10, or, in other words, on the rear surface side of the digital camera, and additionally electrodes, which are transparent electrodes 14 in the present embodiment, are formed in a predetermined pattern on an upper surface of the transparent substrate 12. The liquid crystal display device 10, the transparent substrate 12, and the transparent electrodes 14 constitute the touch screen provided on the rear surface of the digital camera. The types of a touch screen include, for example, a resistive type, a capacitive type, an ultrasonic type, and an optical type, and although any type may be used, a capacitive touch screen is used in the present embodiment. The capacitive type further includes a projected capacitive type in which electrodes (sensor wires) are provided in the form of a matrix to detect a change in capacitance between the electrodes when the touch screen is touched, and a surface capacitive type in which the touch screen is constructed by a transparent conductive layer and electrodes located at four corners, and voltages having the same phase are applied to the electrodes located at the four corners to calculate a ratio of amounts of current flowing from the four corners when the touch screen is touched. A projected capacitive type touch screen is used in the present embodiment. Further, instead of providing electrodes in the form of a matrix, a plurality of transparent electrodes 14 formed of a conductive material are two-dimensionally arranged in a predetermined shape (for example, a triangular shape) on one surface of the transparent substrate 12 (on the rear surface side of the digital camera), so that the area of an electrode having a triangular shape is continuously changed according to the position on the transparent substrate 12. FIG. 2 shows a schematic plan view of a digital camera. The plurality of transparent electrodes 14, each having a triangular shape, are adjacently formed in a such manner that their oblique sides face one another. When the triangular shape transparent electrodes 14 are grouped into two upper and lower groups 14*a* and 14*b* in the plan view as shown, it can be described that the two groups 14a and 14b are arranged so that they engage with each other in a sawtooth pattern. In order to accurately detect the position of a user's touch, it is preferable to form each of the plurality of triangular shape transparent electrodes 14 to be as small as possible. The plurality of triangular shape transparent electrodes 14 are electrically insulated from each other, and wires are connected to the respective transparent electrodes 14. Because the area of a triangular shape transparent electrode 14 varies continuously, when a user touches the screen, capacitance between electrodes changes uniquely in accordance with the area of the electrode as measured at the touch position, and the two-dimensional position of the touched portion can be detected. It should be understood that the electrode structure described above is merely one example, and any electrode structure may be used.

Returning again to FIG. 1A, a circuit substrate 18 is provided below the liquid crystal display device 10 and the transparent substrate 12. An electrode 20 is formed on the circuit substrate 18, and a dome-shaped toggle spring 22 is provided to enclose the electrode 20. Further, a hole is formed at a position corresponding to a portion above the electrode 20 and the toggle spring 22 in the transparent substrate 12 which forms the touch screen, and a pushbutton 16 serving as a shutter release button is provided in this hole. The pushbutton 16 is inserted into the hole of the transparent substrate 12. A projection is provided below the pushbutton 16, and a lower end of the projection is pushed upward by a spring 24 so that it is spaced a predetermined distance from the dome-shaped toggle spring 22. Further, transparent electrodes 14 having a pattern different from the predetermined pattern of the transparent electrodes 14 that form the touch screen are provided on the transparent substrate 12 around the pushbutton 16. The wires connected to the respective transparent electrodes 14 that form the touch screen and wires connected to the respective transparent electrodes 14 formed around the pushbutton 16 are all connected to the circuit substrate. The circuit substrate has a signal processing IC mounted thereon, and the signal processing IC detects a change in capacitance of the transparent electrodes 14 for the touch screen, and detects a change in capacitance of the transparent electrodes 14 formed around the pushbutton 16. In other words, the circuit substrate for detecting a touch operation performed on the touch screen and the circuit substrate for detecting a touch operation performed on the pushbutton 16 are identical.

FIG. 1A shows a state in which the pushbutton 16 is not operated by a user. In this state, the lower end of the projection or the rod provided below the pushbutton 16 does not contact the dome-shaped toggle spring 22, and also does not contact the electrode 20. Therefore, as the signal processing IC does not detect a change in capacitance of the transparent electrodes 14, and also does not detect contact with the electrode 20, switches of the pushbutton 16, or, in other words, a touch switch and a pushbutton switch, both remain OFF.

FIG. 1B shows a state in which, from the state shown in FIG. 1A, a user has lightly contacted (touched) the pushbutton 16. When a user lightly touches the pushbutton 16, a finger of the user comes into contact with the transparent electrodes 14 provided on the transparent substrate 12 around the pushbutton 16. In response to the touch of a user's finger on the transparent electrodes 14, the touch switch is turned ON. More specifically, as two ring-shaped transparent electrode patterns are concentrically formed around the pushbutton 16 as shown in the plan view of FIG. 2, when a finger of the user touches these transparent electrode patterns, a change in capacitance occurs between the two transparent electrode patterns. In response to detecting the change in capacitance, an ON signal of the touch switch is output. At this time, the lower end of the projection of the pushbutton 16 is brought into contact with the dome-shaped toggle spring 22, but does not contact the electrode 20 because the toggle spring 22 continues to maintain the dome shape, and the pushbutton switch of the pushbutton 16 remains OFF.

FIG. 1C shows a state in which, from the state shown in FIG. 1B, the user has operated the pushbutton 16 to be further pushed down. As the finger of the user continues to be in contact with the transparent electrodes 14, the touch switch remains ON. On the other hand, as the pushbutton 16 is pushed to a further depth, the lower end of the projection of the pushbutton 16 pushes the toggle spring 22 down, and deforms the toggle spring 22 downward. As a result of this deformation of the toggle spring 22, the toggle spring 22 comes into contact with the electrode 20, and an ON signal of the pushbutton switch of the pushbutton 16 is output. Further, upon deformation of the toggle spring 22, the user feels a tactile click response caused by the deformation of the toggle spring 22. The tactile click response allows the user to reliably perceive the fact that the pushbutton switch has been turned ON. Typically, the feeling of operation that the user perceives only from a touch switch is slight, and it is difficult to realize whether or not the switch is turned ON. By producing a tactile click response of the pushbutton switch, the user can realize that an image of the subject has been captured.

Further, when the user lifts the finger from the state shown in FIG. 1C, the pushbutton 16 is pushed back upward by a resilient force of the spring 24, and the toggle spring 22 is restored to the initial dome shape to be released from contact with the electrode 20.

As described above, as the pushbutton 16 has both a pushbutton switch function and a touch switch function, an ON signal of the touch switch is output in response to a touch operation of the pushbutton 16, and an ON signal of the pushbutton switch is output in response to a second-stage push-down operation of the pushbutton 16. Therefore, metering and focusing can be performed by using an ON signal of the touch switch as an S1 signal, and an image can be captured by using an ON signal of the pushbutton switch as an S2 signal. Additionally, in the present embodiment, because the transparent substrate 12 for forming the touch screen is used without any modification to implement the transparent substrate and the transparent electrodes 14 for providing the touch switch function of the pushbutton 16 around the pushbutton 16, it is possible to achieve a simpler structure and a reduction in number of components to avoid an increase in cost. In a camera, although it is possible for a shutter button to be simply provided with a sensor switch so that metering and display circuits are caused to operate in response to detecting that a user has lightly touched the shutter button, this causes an increase in cost because it is necessary to provide a sensor switch dedicated to the shutter button. In the present embodiment, because the transparent substrate 12 for forming the touch screen is used without any modification, and the transparent electrodes 14 are formed on the same surface of the transparent substrate 12 as for the transparent electrodes 14 for forming the touch screen to achieve the touch switch function of a shutter release button, the manufacturing cost can be reduced compared with a conventional structure.

In the present embodiment, although the transparent electrodes 14 are formed on the transparent substrate 12, the transparent electrodes 14 may be formed on a transparent film which is formed on the transparent substrate 12.

Figure 3:
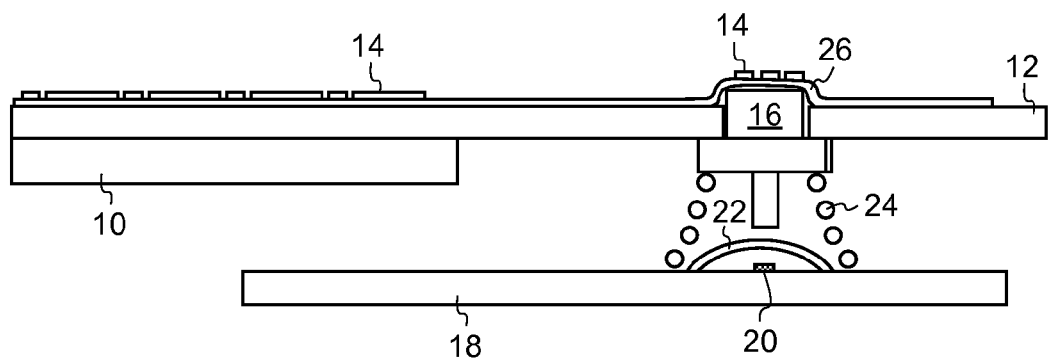
FIG. 3 is a schematic cross-sectional view of an operation device according to an alternative embodiment of the present invention.
Figure 4:
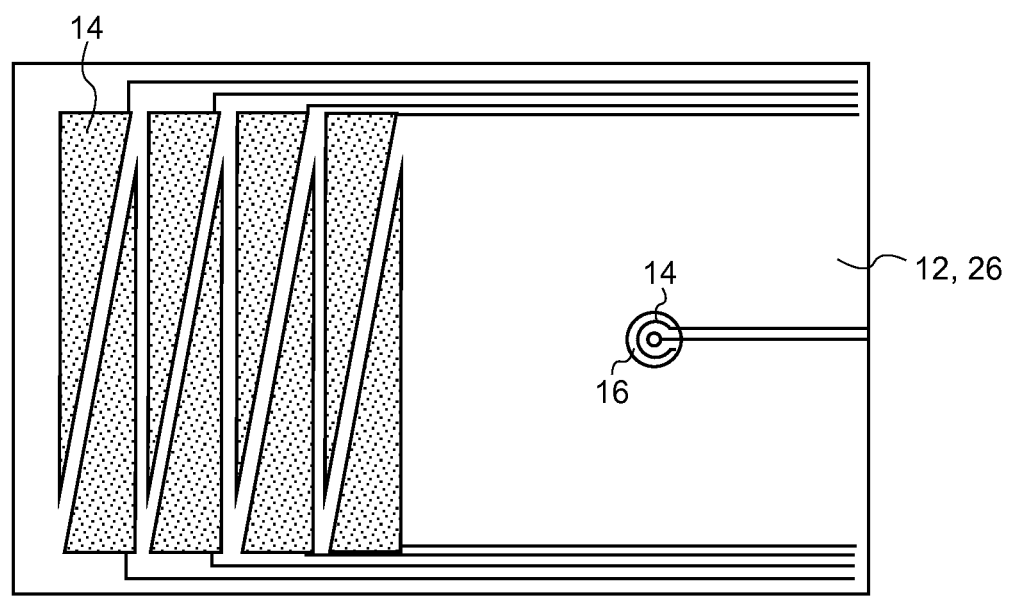
FIG. 4 is a schematic plan view of the operation device according to the alternative embodiment.

FIG. 3 and FIG. 4 show a schematic cross-sectional view and a plan view of a digital camera according to another embodiment of the present invention. In contrast to FIG. 1A, a flexible transparent film 26 is formed on the transparent substrate 12, the pushbutton 16 is covered by the transparent film 26, and the transparent electrodes 14 are formed on the transparent film 26. The transparent substrate 12 and the pushbutton 16 are protected by the transparent film 26. Particularly, although, as the pushbutton 16 is inserted in the hole provided in the transparent substrate 12, foreign matter may otherwise enter through a gap between the hole portion and the pushbutton 16, by covering the pushbutton 16 with the transparent film 26, it is possible to prevent foreign matter from entering. When a user pushes the pushbutton 16 halfway down, a finger of the user comes into contact with the transparent electrodes 14, and an ON signal of the touch switch is output. When the user further pushes the pushbutton 16 fully down, the projection or the rod provided below the pushbutton 16 contacts the dome-shaped toggle spring 22, and deforms the toggle spring 22 to come into contact with the electrode 20, and an ON signal of the pushbutton switch is output.

Although the embodiments of the present invention have been described above, the present invention is not limited to these embodiments, and various modifications are possible.

For example, although, in the above-described embodiments, the pushbutton 16 is provided as a shutter release button, the pushbutton 16 may be provided as a button having a different function, and the present invention may be applied to any button for performing different operations in response to an ON signal of the touch switch, and in response to an ON signal of the pushbutton switch.

Further, although the above-described embodiments have been described taking a digital camera as an example of an image capturing device, the present invention may also be similarly applied to another type of device having an image capturing function, such as a mobile phone, a personal digital assistant, or a video camera.

Further, although, in the above-described embodiments, a pushbutton switch is implemented by the toggle spring 22 and the electrode 20, the present invention is not limited to such a structure, and any switch structure which is closed (turned ON) in response to a push-down operation of the pushbutton 16 may be used.

Further, although, in the above-described embodiments, the touch screen and the pushbutton 16 provided on the rear surface of a digital camera have been described as components located at different positions, the pushbutton 16 may be formed in a portion of the touch screen.

Further, although, in the above-described embodiments, the transparent electrodes 14 are formed on the transparent substrate 12, because a transparent electrode typically has a high resistivity, a different metal may also, for example, be added by deposition or plating for portions where transparency is not required, so that the resistivity is reduced. Similarly, the transparent film 26 may also be non-transparent for portions where transparency is not required.

Further, although, in the above-described embodiments, electrodes are formed on an upper surface of the transparent substrate 12, or, in other words, a front side of the transparent substrate 12, electrodes may also be formed on a lower surface of the transparent substrate 12, or, in other words, a back side of the transparent substrate 12. Specifically, the thickness of the transparent substrate 12 is reduced, and electrodes for the touch screen and electrodes for the pushbutton are formed on a lower surface (or a back surface) of the transparent substrate 12. By forming electrodes on the back surface of the substrate, it is possible to protect the electrodes.

Parts List

10 Liquid Crystal Display Device
12 Transparent Substrate
14 Transparent Electrode
16 Pushbutton
18 Circuit Substrate
20 Electrode
22 Dome-Shaped Toggle Spring
24 Spring
26 Transparent Film

The invention claimed is:

1. A device comprising:
   a substrate;
   a pushbutton located within a hole provided in the substrate;
   a touch switch configured to detect a touch operation of the pushbutton, wherein the touch switch comprises a plurality of electrodes located on an outermost surface of the substrate and around the pushbutton; and
   a pushbutton switch configured to close in response to a push-down operation of the pushbutton,
   wherein the substrate forms at least in part a touch screen, and wherein the outermost surface of the substrate on which the plurality of electrodes are located is a same surface as a surface of the substrate on which electrodes configured to form the touch screen are located, and
   wherein the plurality of electrodes of the touch switch comprises a ring-shaped electrode formed concentrically around the pushbutton switch.

2. The device of claim 1, further comprising a processor configured to cause at least one of a metering operation or a focusing operation in response to the touch switch being turned ON.

3. The device of claim 2, wherein the processor is further configured to capture an image in response to the pushbutton switch being turned ON.

4. The image capture device of claim 1, wherein the first electrode and the second electrode comprise transparent electrodes.

5. The device of claim 1, wherein the pushbutton is a shutter release button.

6. The device of claim 1, wherein the substrate comprises a transparent substrate.

7. The device of claim 1, wherein the device comprises at least one of a digital camera, a mobile phone, a personal digital assistant, or a video camera.

8. The device of claim 1, further comprising a display screen, wherein the substrate is located on a surface of the display screen.

9. The device of claim 1, wherein the plurality of electrodes of the touch switch are formed in a pattern different from a pattern of the electrodes configured to form the touch screen.

10. The device of claim 1, wherein the plurality of electrodes comprises a plurality of transparent electrodes.

11. A device comprising:
    a substrate;
    a pushbutton located within a hole provided in the substrate;
    a touch switch configured to detect a touch operation of the pushbutton, wherein the touch switch comprises a plurality of electrodes located on a surface of the substrate and around the pushbutton;
    a pushbutton switch configured to close in response to a push-down operation of the pushbutton; and
    a film located between the substrate and the plurality of electrodes, wherein the film covers the pushbutton;
    wherein the substrate forms at least in part a touch screen, and wherein the surface of the substrate on which the plurality of electrodes are located is a same surface as a surface of the substrate on which electrodes configured to form the touch screen are located.

12. The device of claim 11, wherein the film comprises a flexible transparent film.

13. An image capture device comprising:
a touch screen comprising a substrate and a first electrode located on an outermost surface of the substrate;
a shutter release button located within an opening in the substrate;
a touch switch configured to detect a touch operation of the shutter release button, wherein the touch switch comprises a second electrode formed around at least a portion of the shutter release button over the outermost surface of the substrate; and
a pushbutton switch configured to close in response to a push-down operation of the shutter release button;
a film covering the pushbutton switch, wherein the second electrode is located on the film; and
a processor configured to cause at least one of a metering operation or a focusing operation to be performed in response to activation of the touch switch.

14. The image capture device of claim 13, wherein the processor is further configured to cause an image capture operation to be performed in response to activation of the pushbutton switch.

15. The image capture device of claim 13, wherein the image capture device comprises at least one of a digital camera, a mobile phone, a personal digital assistant, or a video camera.

16. The image capture device of claim 13, further comprising a display screen, wherein the touch screen is located on the display screen.

17. The image capture device of claim 13, wherein the film comprises a flexible transparent film.

18. The image capture device of claim 13, wherein the second electrode comprises a ring-shaped electrode formed concentrically around the pushbutton switch.

* * * * *